(12) United States Patent
Skjelmose et al.

(10) Patent No.: US 11,626,739 B2
(45) Date of Patent: Apr. 11, 2023

(54) HYBRID POWER PLANT AND A METHOD FOR CONTROLLING A HYBRID POWER PLANT

(71) Applicant: VESTAS WIND SYSTEMS A/S, Aarhus (DK)

(72) Inventors: Mads Rajczyk Skjelmose, Risskov (DK); Henrik Møller, Egå (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 17/417,097

(22) PCT Filed: Nov. 28, 2019

(86) PCT No.: PCT/DK2019/050372
§ 371 (c)(1),
(2) Date: Jun. 21, 2021

(87) PCT Pub. No.: WO2020/125883
PCT Pub. Date: Jun. 25, 2020

(65) Prior Publication Data
US 2022/0060025 A1 Feb. 24, 2022

(30) Foreign Application Priority Data
Dec. 21, 2018 (DK) .......................... PA 2018 70857

(51) Int. Cl.
*H02J 3/38* (2006.01)
*H02J 3/32* (2006.01)
*H02J 3/46* (2006.01)

(52) U.S. Cl.
CPC ............... *H02J 3/381* (2013.01); *H02J 3/32* (2013.01); *H02J 3/46* (2013.01); *H02J 2300/20* (2020.01)

(58) Field of Classification Search
CPC ...... H02J 3/381; H02J 3/32; H02J 3/46; H02J 2300/20; H02J 3/38; H02J 3/14;
(Continued)

(56) References Cited

U.S. PATENT DOCUMENTS

2010/0090532 A1* 4/2010 Shelton ................. H02J 7/0048
307/46
2011/0273129 A1 11/2011 Coe et al.
(Continued)

FOREIGN PATENT DOCUMENTS

DE 102011055249 A1 5/2013
EP 2889473 A1 7/2015
(Continued)

OTHER PUBLICATIONS

Danish Patent and Trademark Office 1st Technical Examination for Application No. PA 2018 70857 dated Jul. 24, 2019.
(Continued)

*Primary Examiner* — Toan T Vu
(74) *Attorney, Agent, or Firm* — Patterson + Sheridan, LLP

(57) ABSTRACT

The invention relates to a hybrid power plant for producing power to the electrical grid, the hybrid power plant comprising a plurality of energy assets; a first renewable power generating unit, such as wind turbine generators, and an energy storage unit, preferably a battery energy storage system. The hybrid power plant has a power plant controller arranged to communicate with the plurality of energy assets, and, when an under-frequency event occurs, the energy storage unit provides frequency support during the under-frequency event by providing additional power as a function of a state of charge of the energy storage unit at the time when the under-frequency event occurs. Thus, during an
(Continued)

under-frequency event, it is possible to obtain a more stable power output from the hybrid power plant.

9 Claims, 17 Drawing Sheets

(58) Field of Classification Search
CPC ..... Y02B 70/3225; Y02E 10/76; Y02E 40/10; Y02E 70/30; Y04S 20/222
See application file for complete search history.

(56) References Cited

U.S. PATENT DOCUMENTS

| | | | | |
|---|---|---|---|---|
| 2012/0139241 A1* | 6/2012 | Haj-Maharsi | ........... | H02J 3/381 |
| | | | | 290/44 |
| 2014/0142776 A1* | 5/2014 | Nielsen | ................... | H02J 3/466 |
| | | | | 700/295 |
| 2014/0244056 A1 | 8/2014 | Pena et al. | | |
| 2014/0316601 A1 | 10/2014 | Markowz et al. | | |
| 2014/0327404 A1 | 11/2014 | Markowz et al. | | |
| 2014/0375125 A1 | 12/2014 | Ye et al. | | |

FOREIGN PATENT DOCUMENTS

| | | |
|---|---|---|
| WO | 2017062906 A1 | 4/2017 |
| WO | 2017161785 A1 | 9/2017 |
| WO | 2020125883 A1 | 6/2020 |

OTHER PUBLICATIONS

PCT Notification of Transmittal of the International Search Report and the Written Opinion of the International Searching Authority, or the Declaration for Application No. PCT/DK2019/050372 dated Feb. 17, 2020.

* cited by examiner

HYBRID POWER PLANT AND A METHOD FOR CONTROLLING A HYBRID POWER PLANT

FIELD OF THE INVENTION

The present invention relates to a hybrid power plant with a plurality of energy assets comprising several renewable power generating units, including a first renewable power generating unit comprising a plurality of first wind turbine generators and, optionally, a second renewable power generating unit preferably comprising solar power units, and an energy storage unit, such as a large battery. The invention also relates to a corresponding method, a corresponding controller, and a corresponding computer program product to implement the present invention.

BACKGROUND OF THE INVENTION

Recently, various kinds of renewable energy are gaining increased success in countries around the world to produce electricity for the local electrical grid due to the gradual transition to a non-fossil based energy system taking place, but electrical grids also have requirements for such an integration of renewable energy to be effective.

For example, the high penetration of wind turbines, or wind turbine generators (WTG), in the electrical grids has motivated requirements for the wind turbine generators on how they should contribute to the stability of the electrical grids. Such requirements are included in so-called grid codes defined by the transmission system operator (TSO), which the wind power plants, sometimes called wind farms, must comply with for producing power to the electrical grid.

Recently, there is an emerging trend to integrate various renewable energy sources into a so-called hybrid power plant with a plurality of energy assets i.e. with several power generating units, such as wind turbines generators and solar power units, together with an energy storage system, such as a large battery. Expectations are set at a high reliability of power produced from a hybrid power plant because of the possible complementary nature of the local wind and solar sources of energy, e.g. the sun may not be shining in the evening, when the winds are relatively strong.

Some of the requirements, which may be included in the grid codes, include maintaining a certain delivered power, voltage and frequency, and possibly having certain limits for the rate of changes of such parameters, e.g. so-called ramp rates. These requirements are expectantly also imposed on future hybrid power plants, and it is therefore important to be able to deliver energy according to the grid codes for such hybrid power plants, too.

Additionally, there are new challenges with integrating of various power generating sources, e.g. wind energy and solar energy, because of their dissimilar characteristics, especially their response to changing conditions and requirements. Overall, it is also an overriding aim to produce the maximum allowed amount of energy, which may be somewhat challenging considering the various power generating sources and their different energy production qualities, e.g. stability over time, control over distances within the hybrid power plant, response to changes and events in the grid, etc.

Hence, an improved hybrid power plant would be advantageous, and in particular a more efficient and/or reliable hybrid power plant would be advantageous.

OBJECT OF THE INVENTION

It is a further object of the present invention to provide an alternative to the prior art.

In particular, it may be seen as an object of the present invention to provide a hybrid power plant that solves the above mentioned problems of the prior art with producing power in compliance with grid codes, especially upon changing of certain parameters, such as a frequency, while at the same time optimizing energy production.

SUMMARY OF THE INVENTION

Thus, the above described object and several other objects are intended to be obtained in a first aspect of the invention by providing a hybrid power plant connected to an associated electrical grid for producing power to said electrical grid, the hybrid power plant comprising a plurality of energy assets, the plurality of energy assets comprising:

a first renewable power generating unit, and an energy storage unit, preferably a battery energy storage system, said energy storage unit being capable of storing energy from said first renewable power generating units, and delivering power to said electrical grid when required, wherein the hybrid power plant further comprises a power plant controller arranged to communicate with the plurality of energy assets, the power plant controller being arranged to measure and/or receive information from the electrical grid that an under-frequency event has occurred in the electrical grid, and, when such an under-frequency event occurs, the power plant controller being further arranged for communicating to the energy storage unit to provide frequency support during the under-frequency event by providing additional power ($\Delta P$) as a function of a state of charge of the energy storage unit at the time when said under-frequency event occur.

The invention is particularly advantageous for obtaining a hybrid power plant with different renewable power generating units including an energy storage unit, where the hybrid power plant is capable of providing improved frequency support during a predefined period during an unforeseen under-frequency event by utilising the energy storage unit in a new and advantageous manner. Thus, by implementing the present invention it is possible to obtain a more stable power output from the hybrid power plant. The invention is not limited to for example a start-up situation, but may be implemented during normal power production, and activated during an under-frequency event as the skilled person will understand. With respect to the power production, the simulations performed by the inventors, and explained in more detail below, show that advantageous improvements of stability of the power production, particularly frequency stability, may in certain situations result from implementing the present invention. Another advantage by the invention is that a sustainable and more predictable frequency support, even under multiple under-frequency events, is provided.

In the context of the present invention, the term 'under-frequency event' (UFE) may be defined as a deviation below a target frequency, such as around 50 Hz or around 60 Hz, normally set by the transmission system operator (TSO), preferably under a frequency dead band defined by the grid codes and/or the transmission system operator (TSO). The skilled person will understand that these dead bands of a first kind for frequency control may be around 0.005 Hz, 0.01 Hz, 0.02 Hz, or 0.05 Hz and even up to 0.1 Hz, or 0.5 Hz.

In the context of the present invention, the term 'hybrid power plant' will be broadly understood as a power plant capable of producing power for the electric grid based on several sources of energy, including, but not limited to, wind energy, solar energy, hydro energy, thermal energy, etc., in the sense that the hybrid power plant has a mixture of energy sources producing power. It is to be understood that the hybrid power plant will be controlled collectively at some overall level of control to produce power, which—in the present context—is called a power plant controller (PCC). The various energy assets may, additionally or alternatively, have some degree of local control, e.g. a slave controller. It is also to be understood that the hybrid power plant may have a large geographical extent, e.g. the plurality of energy assets may be scattered at several locations, for example up to 2, 5, 10, 15 or 20 km, or even longer, apart, as long as the power plant controller is capable of provide some degree of overall level of control according to the present invention, especially considering electrical losses and/or control and measurement delays.

In the context of the present invention, the first renewable power generating unit comprises a plurality of wind turbines generators, each wind turbine generator (WTG) may comprise a tower and a rotor with at least one rotor blade, such as three blades. The rotor may be connected to a nacelle, which is mounted on top of the tower and being adapted to drive a generator situated inside the nacelle. The rotor is rotatable by action of the wind. The wind induced rotational energy of the rotor blades is transferred via a shaft to the generator. Thus, the wind turbine generator is capable of converting kinetic energy of the wind into mechanical energy by means of the rotor blades and, subsequently, into electric power by means of the generator. The generator may include a power converter for converting the generator AC power into a DC power and a power inverter for converting the DC power into an AC power to be injected into the electrical power grid. The plurality of wind turbine generators may different, or they may be of the same kind.

In the context of the present invention, the second renewable power generating unit may comprise a plurality of solar power units, which each solar power unit may have e.g. a photovoltaic (PV) solar panel, a concentrated solar power (CSP) unit, or other solar power units capable of utilising the solar radiation and converting it to electrical power.

In the context of the present invention, the energy storage unit is to be understood broadly as a unit capable of storing energy from the first and/or second renewable power generating units generating power during period of surplus energy, and then store the energy for some period of time until the need arise for the energy to be supplied into the electrical grid. In general the first and second renewable power generating units are renewable in the sense that they rely on renewable sources of energy, which is replenishable on a human timescale, for example from sun, wind, rain, tidal, wave, and/or geothermal sources.

In general, the energy storage unit may be used to store energy from the grid as well, in periods when energy is cheap and release it to the grid when energy is expensive. This is known as "Energy Arbitrage". Thus, it will be understood that for a hybrid power plant to rely on the energy storage unit, the stored energy may be of a certain minimum size to be of any significant use at a later time. Thus, it is considered that a minimum amount of energy of 0.5 MWh, 1 MWh, 2 MWh, 3 MWh, 4 MWh, or 5 MWh, is to be stored by the energy storage unit. Similarly, the power supplied to the electrical grid may be capable of a certain minimum power, for example at least 0.5 MW, 1 MW, 2 MW, 3 MW, 4 MW, or 5 MW, to have an impact on the hybrid power plant complying with the relevant grid codes for power production. Alternatively, the ratio of the energy storage unit power to the total power of the hybrid power plant may be minimum 1%, 2%, 3%, 4% or 5% to have an impact on the electrical grid. Alternatively, the ratio of the energy storage unit power to the total power of the hybrid power plant may be maximum of 20%, 15%, 10%, 8%, 6%, 4% or 2% because the energy storage unit is typically the most expensive energy asset, either at a given moment or averaged over some period of time.

Suitable energy storage units may preferably be based on electrochemical storage, such as a battery energy storage system (BES), more preferably including rechargeable Lithium ion batteries (LIB), but other energy storage units are also contemplated within the present invention, for example based on mechanical storage (e.g. compressed air reservoirs), electrical storage (e.g. so-called supercapacitors), thermal energy storage, or chemical energy storage (e.g. power-to-gas P2G), or other energy storage means suitable for power plant energy storage and subsequent power delivery to the electrical grid. When the energy storage unit is not based on electrical storage of energy, e.g. compressed air or thermal storage, the skilled person will understand that the state of charge (SoC) may be meant as a measure of the amount of energy available from the energy storage unit.

In the context of the present invention, the capability of charging, or discharging, of the energy storage unit should be interpreted broadly as a common measure of the amount of charge, and thereby energy, stored in the energy storage unit, and/or the rate of discharge, or charge, typically the effect of the storage unit, e.g. energy/time. Notice, that the rate of discharge, or charge, of an energy storage unit, e.g. a battery, can be dynamic in the sense that it varies over time as a function of state of charge (SoC), maximum limits, user defined limits, etc. Typically, the state of charge (SoC) is measured relatively as a percentage of the total capability, but other measures, such depth of discharge (DoD) being the inverse of SoC can be used. It is to be understood that the energy storage unit in the context of present typically has a relatively high capability of energy storage in order to have a significant impact on an electrical grid, and therefore the rate of discharge, or charge, and/or the state of charge (SoC) of the energy storage unit could be a combined or collective measure for a plurality of dispersed energy storage units, e.g. a plurality of BESs, different or similar or identical BESs, as the skilled person in energy storage will readily understand.

In the context of the present invention, the first and second renewable power generating units and the energy storage unit may be defined collectively as energy assets. In an embodiment, yet other energy assets could cooperate with the said energy assets of the present invention, especially energy assets based on fossil fuels (carbon based), such power generating unit being based on oil, coal, hydrocarbon gas etc. In this technical field, the energy assets may also be referred to as 'energy actuators', as the skilled person will readily understand. The two terms will be interchangeably used below in the detailed description.

Likewise, in the context of the present invention, a first of the energy assets may be considered as the first renewable power generating unit. The first renewable power generating unit may then in turn comprise a plurality of wind turbine generators (WTGs). These wind turbine generators may then again have shared or common characteristics, for example a plurality of very similar or identical wind turbine generators in a large wind turbine array or wind farm. Similarly, a second of the energy assets may be considered as the second renewable power generating unit. The second renewable power generating unit may then in turn comprise a plurality of solar power units. These solar power units may then again have shared or common characteristics, for example a plurality of very similar or identical solar power unit, e.g. PV units, in a large solar array.

Available power is to be understood as the power which the renewable power generating unit is able to produce. The available power may change over time. For a wind turbine generator, it may depend on the wind speed and/or direction and for a solar power unit, it may be dependent on the solar irradiance.

In one embodiment, the first renewable power generating unit may comprise a plurality of wind turbine generators, such wind turbine generators being a preferred kind of renewable power generating unit. Additionally, or alternatively, the hybrid power plant may comprise a second renewable power generating unit, the second renewable power generating unit being different from first renewable power generating unit, more preferably said second renewable power generating unit comprises a plurality of solar power units as defined above, e.g. a photovoltaic (PV) solar panel, a concentrated solar power (CSP) unit, or other solar power units capable of utilising the solar radiation and converting it to electrical power. In other embodiments, said energy storage unit may be further capable of storing energy from said second renewable power generating unit, and the power plant controller may be further arranged to communicate with the second renewable power generating unit.

In preferred embodiments, the said additional power ($\Delta P$) may be provided as a function of the state of charge (SoC) of the energy storage unit at the time when said under-frequency event occur during the entire duration of said under-frequency event. Thus, the skilled person will understand that depending on the duration of typical under-frequency events and the required frequency support in term of the corresponding power needed, it is possible to dimension a recommended size and/or configuration of the energy storage unit for this embodiment. Alternatively, said additional power ($\Delta P$) may provided as a function of the state of charge (SoC) of the energy storage unit at the time when said under-frequency event occur during, at least, a fraction of the duration of said under-frequency event, such as 10%, 20%, 30%, 40%, 50%, 60%, 70%, 80%, 90%, of the under-frequency event, such as an average UFE being calculated or estimated.

In other embodiments, the said function may be a linear function of the state of charge of the energy storage unit at the time when said under-frequency event occur, because this enables a simple and robust response of the energy storage unit during under-frequency events. It is to be understand that typically the invention will implemented in practise in a real hybrid power plant in combination with a number of other frequency control methods for other purposes, either internally due to plant constraints of e.g. safety/production limits and/or externally given from the TSO, and therefore it is of course to be understood that alternative frequency control regimes may implemented in a hybrid power plant, the control of the present invention only being activated during an UFE, and if not overruled or prioritized lower by other frequency control regimes. Preferably, a slope of said linear function is dependent on the frequency of the grid (f), e.g. by providing a frequency response tables (lock-up tables, LUT) or other dependencies available to the skilled person. Alternatively, or additionally, the slope of said linear function may be further dependent on the configuration of the energy storage unit.

In some embodiments, the power plant controller may be arranged to reserve a pre-defined level of state of charge from the energy storage unit for providing frequency support in case of an under-frequency event, the level above said pre-defined level of state of charge from the energy storage unit being available for power production from the hybrid power plant when there is no under-frequency event to ensure stability of the frequency support. Additionally, the power plant controller may be arranged to prioritize charging of the energy storage unit when the current state of charge (SoC) is below said pre-defined level state of charge from the energy storage unit to provide even further stability of the frequency support during an under-frequency event.

In some embodiments, the hybrid power plant may further comprise:
  a module for deriving an estimated value for electrical losses in the hybrid power plant;
  a module for deriving a measured value for electrical losses in the hybrid power plant, based on a difference between an aggregated power production from the plurality of energy assets and a power measurement at a point of common coupling (PoC), and
  a regulator arranged to apply the estimated value for electrical losses and the measured value for electrical losses in an active power control loop in the power plant controller, the active power control loop being arranged to control an active power production of the hybrid power plant at the point of common coupling,
wherein the available power from said first renewable power generating unit and/or said second renewable power generating unit is calculated using said regulator. Thus, if estimates of power may differ from actual measurements for example due to electrical losses, this embodiment may compensate and/or reduce this resulting in even better values for the available power.

In a second aspect, the invention relates to a method for controlling a hybrid power plant, the hybrid power plant being connected to an electrical grid for producing power to said electrical grid, the hybrid power plant comprising a plurality of energy assets, the plurality of energy assets comprising:
  a first renewable power generating unit, and
  an energy storage unit, preferably a battery energy storage system, said energy storage unit being capable of storing energy from said first renewable power generating unit, and delivering power to said electrical grid when required,
wherein the method comprises:
  communicating with the plurality of energy assets,
  measuring and/or receiving information from the electrical grid that an under-frequency event has occurred in the electrical grid, and,
  when such an under-frequency event occurs, providing frequency support during the under-frequency event by providing additional power ($\Delta P$) as a function of a state of charge (SoC) of the energy storage unit at the time when said under-frequency event occur.

In a third aspect, the invention relates to a power plant controller for controlling an associated hybrid power plant connected to an associated electrical grid for producing power to said electrical grid, the hybrid power plant comprising a plurality of energy assets, the plurality of energy assets comprising:
  a first renewable power generating unit, and
  an energy storage unit, preferably a battery energy storage system, said energy storage unit being capable of storing energy from said first renewable power generating unit, and delivering power to said electrical grid when required, wherein the power plant controller is arranged to communicate with the plurality of energy assets, the power plant controller being arranged to measure and/or receive information from the electrical grid that an under-frequency event has occurred in the electrical grid, and, when such an under-frequency event occurs, the power plant controller being further arranged for communicating to the energy storage unit to provide frequency support during the under-frequency event by providing additional power (ΔP) as a function of a state of charge (SoC) of the energy storage unit at the time when said under-frequency event occur.

In a fourth aspect, the invention relates to a computer program product being adapted to enable a computer system comprising at least one computer having data storage means in connection therewith to control a hybrid power plant according to the first and/or second aspect of the invention.

This aspect of the invention is particularly, but not exclusively, advantageous in that the present invention may be accomplished by a computer program product enabling a computer system to carry out the operations of the second aspect of the invention when down- or uploaded into the computer system.

In yet another aspect, the invention relates to a data storage medium whereupon such a computer program product may be provided, i.e. on any kind of computer readable medium, or through a network.

The individual aspects of the present invention may each be combined with any of the other aspects. These and other aspects of the invention will be apparent from the following description with reference to the described embodiments.

BRIEF DESCRIPTION OF THE FIGURES

The present invention will now be described in more detail with regard to the accompanying figures. The figures show one way of implementing the present invention and is not to be construed as being limiting to other possible embodiments falling within the scope of the attached claim set.

DETAILED DESCRIPTION OF AN EMBODIMENT

Figure 1:
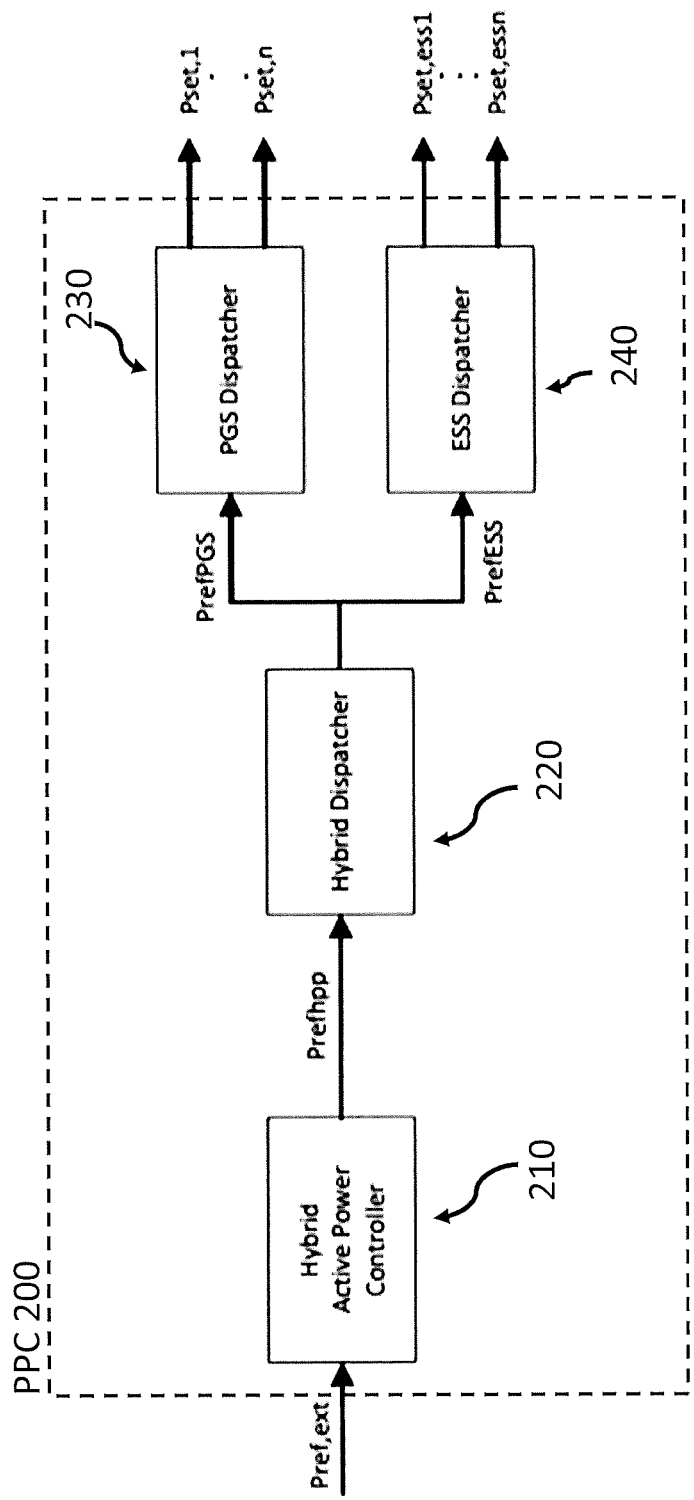
FIG. 1 is a simplified schematic drawing of power plant controller (PPC) of the hybrid power plant according to an embodiment of the present invention.

FIG. 1 is a simplified schematic drawing of power plant controller (PPC) 200 of the hybrid power plant according to an embodiment of the present invention.

Figure 3:
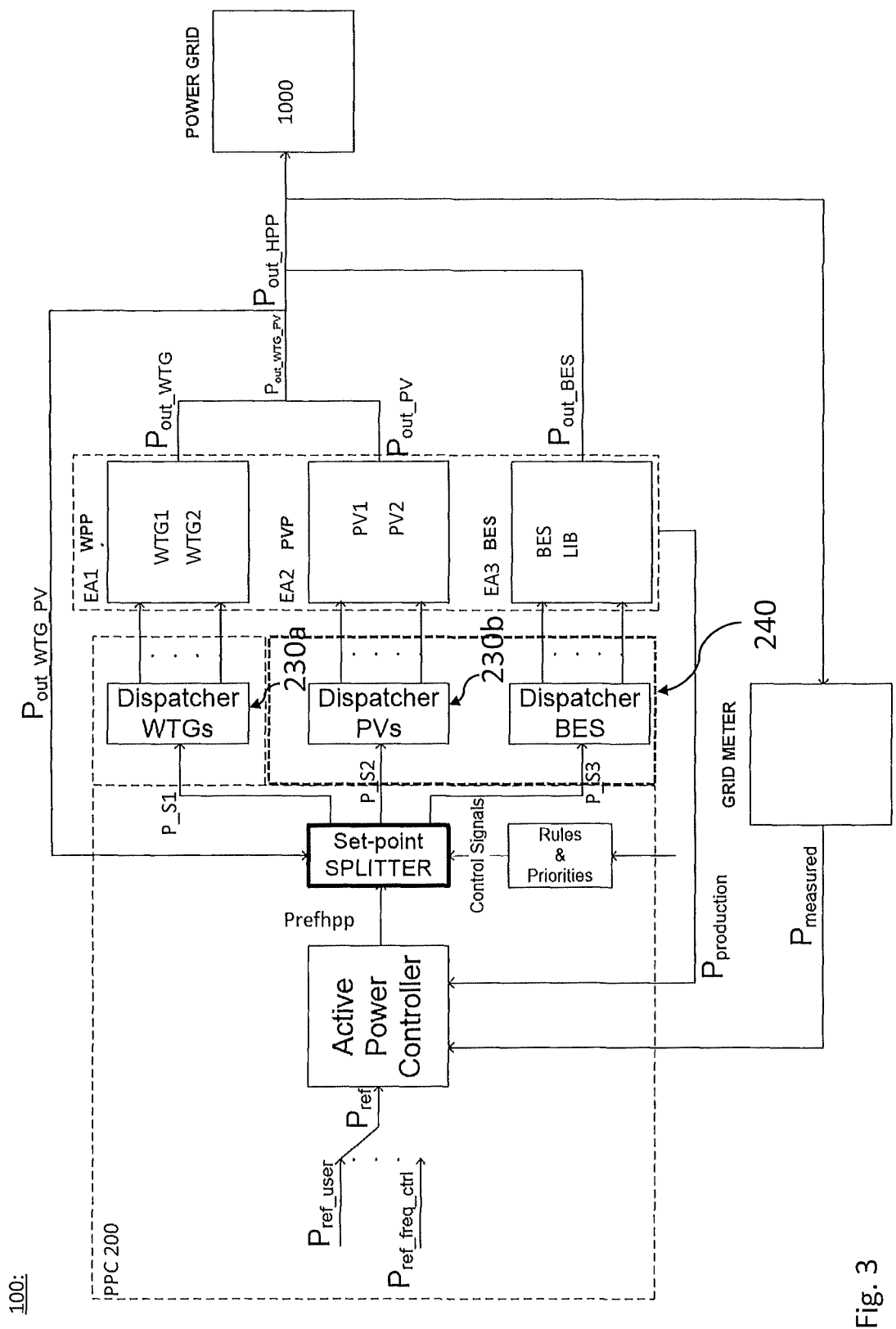
FIG. 3 is a schematic drawing of the hybrid power plant according to another embodiment of the present invention.
Figure 4A:
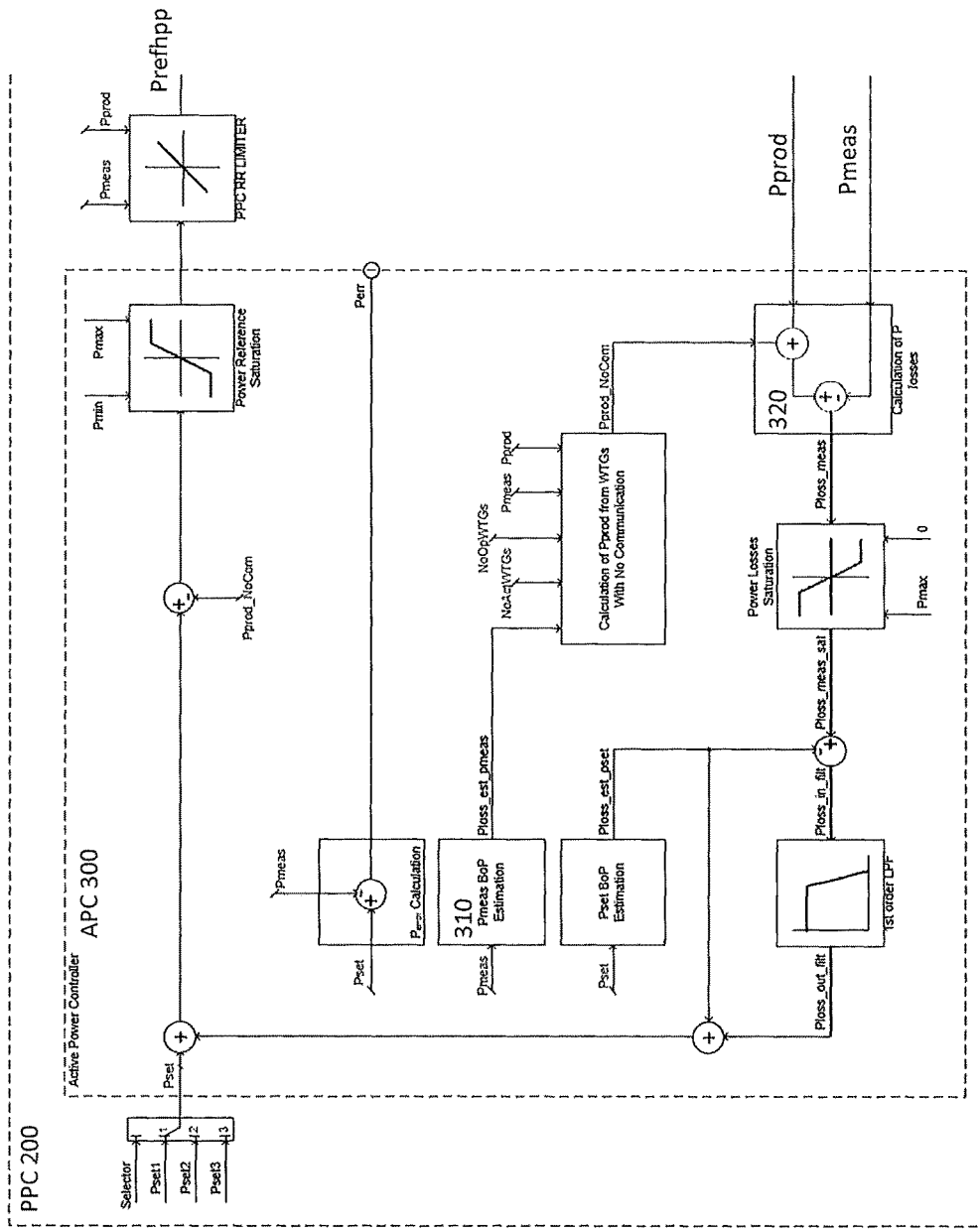
FIG. 4 is a more detailed drawing of the hybrid power plant according to another embodiment of the present invention.

The hybrid power plant 100, cf. FIGS. 3 and 4, comprises a power plant controller PPC 200 arranged to communicate with the plurality of energy assets (not shown in FIG. 1), the power plant controller being arranged for receiving an active power reference P_REF,ext, preferably from a transmission system operator (TSO), and, using a hybrid active power controller 210, calculates a hybrid power plant reference Prefhpp based on for example a desired mode of operation like Frequency Control, Active power curtailment, etc. of the hybrid power plant.

The power plant controller (PPC), 200 is further arranged, in response to a first comparison, for distributing set points PrefPGS, PS_1, PS_2, and particularly Pset1 . . . Pset,n, to the first renewable power generating unit and the second renewable power generating unit, and distributing one, or more, corresponding set points, PS_3, PrefESS, more particularly Pset,ess1 . . . , Pset,essn, to the energy storage unit ESU, cf. FIGS. 3-4, so as to deliver power from the hybrid power plant in accordance with the received active power reference P_REF,ext, which is transformed into Prefhpp as shown in FIG. 1. A hybrid dispatcher 220 receives the Prefhpp control signal and calculates a PrefPGS control signal for the power generating units, and a PrefESS control signal for the energy storage unit or system ESS. At the next level the PrefPGS signal is then distributed, or dispatched, using via a PGS dispatcher 230 to the individual power generating units, e.g. WTGs or PVs. Likewise, the PrefESS signal is then distributed, or dispatched, using via a ESS dispatcher 240 to the energy storage unitities in a lower level, e.g. a plurality of batteries.

Figure 2:
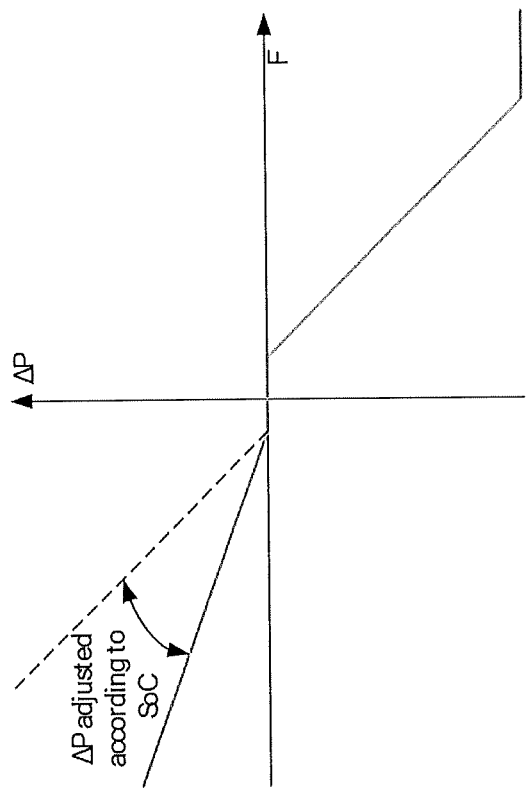
FIG. 2 is a schematic power-frequency graph according to the present invention.

FIG. 2 is a schematic power-frequency graph according to the present invention, wherein the power plant controller PPC, 200, as shown in FIG. 1, is arranged to communicate with the plurality of energy assets, the power plant controller being arranged to measure and/or receive information from the electrical grid that an under-frequency event (UFE) has occurred in the electrical grid 1000, cf. FIG. 3. When such an under-frequency event occurs, the power plant controller is further arranged for communicating to the energy storage unit ESU, or BES, to provide frequency support during the under-frequency event (UFE), e.g. an unexpected frequency drop, by providing additional power ΔP as a function of a state of charge SoC of the energy storage unit at the time when said under-frequency event occur, in the following called SoC_mem, as schematically indicated in FIG. 2.

FIG. 3 is a schematic drawing of the hybrid power plant according to another embodiment of the present invention. The hybrid power plant 100 is connected to associated electrical grid 1000 for producing power to the electrical grid, the hybrid power plant comprising a plurality of energy assets EA1, EA2 and EA3.

Thus, a first renewable power generating unit EA1 or 1RPGU is part of the plant 100, i.e. in this embodiment a plurality of wind turbine generators, WTG1 and WTG2, and a second renewable power generating unit, EA2, 2RPGU, i.e. in this embodiment a plurality of solar power units, PV1 and PV2. For simplicity, only two wind turbine generators and solar power units are indicated in this embodiment, but of course the skilled person would understand that any number of renewable power generating units is in principle contemplated within the teaching and principle of the present invention.

Additionally, an energy storage unit ESU or system ESS, is part of the plant 100, preferably a battery energy storage system BES, which is capable of storing energy from said first and second renewable power generating units, i.e. from the wind turbine generators, WTG1 and WTG2, and solar power unit, PV1 and PV2, and the energy storage unit being arranged for delivering power to said electrical grid 1000 when required. The energy storage unit is indicated as the third energy asset EA3.

The hybrid power plant 100 further comprises a power plant controller (PPC) 200 arranged to communicate with the plurality of energy assets, i.e. receive information about their state/condition and generally send control signals to each of them, and the power plant controller is particularly arranged for receiving an active power reference (as indicated to the left of the PPC), for example provided by a grid operator, and correspondingly distribute active power set points, P_S1, P_S2, and P_S3 to the plurality of energy assets as shown in FIGS. 1 and 3. As an intermediate control signal hybrid power plant reference Prefhpp is also used. It may be mentioned that in some embodiments, the WTG Dispatcher may form part of the controller PPC 200. The P_REF is the reference received either from the grid operator (TSO) i.e. Pref,ext in FIG. 1, or a user, but it can also be from another controller—such as Frequency Controller as indicated by the signal name Pref_freq_ctrl. The power plant controller 200 may comprise wind turbine generator WTG dispatcher 230a, PV dispatcher 230b, and BES dispatcher 240, as schematically indicated in FIG. 3.

In general it is expected that the PPC 200 will communicate directly with the WTG1 and WTG2, and it will communicate to the energy storage BES and PV1 and PV2 through dedicated BES and PV controllers (similar to a power plant controller PPC but specifically for PV and BES). These dedicated controllers will then distribute the set-point to individual PV array converters or individual ES converters (i.e. the PV and ES systems are composed of a plurality of units, just as the wind power plant system). In the shown embodiment, the controller PPC communicates via a Set-point SPLITTER, the Set-point SPLITTER then dispatches set point PS_1, PS_2 and PS_3 further to a dispatcher for each energy assets.

It is also contemplated that it is possible to distribute set points to WTGs through local controllers. That is one master PPC distributes set-points to one/more slave PPC, for example for large wind turbine parks with a large number of wind turbine generators, such as more than 20 wind turbine generators, or more than 40 wind turbine generators.

FIG. 4 is a more detailed drawing of the hybrid power plant according to another embodiment of the present invention. FIG. 4 (both 4A and 4B) is a schematic drawing of the hybrid power plant according to another embodiment of the present invention. Thus, in addition to the hybrid power plant shown in FIG. 3, the hybrid power plant 100 further comprises particularly a module 310 for deriving an estimated value for electrical losses in the hybrid power plant. Moreover, a module 320 is present for deriving a measured value for electrical losses in the hybrid power plant, based on a difference between an aggregated power production Pprod from the plurality of energy assets, here EA1 being WTG actuators, EA2 being PV actuators, and EA3 being BES actuators, and a power measurement Pmeas at a point of common coupling (PoC) with the grid 1000. In addition, the power plant controller comprises a regulator 300 being an active power controller arranged to apply this estimated value for electrical losses and the measured value for electrical losses in an active power control loop in the power plant controller 200, the active power control loop being arranged to control an active power production of the hybrid power plant 100 at the point of common coupling.

Figure 4B:
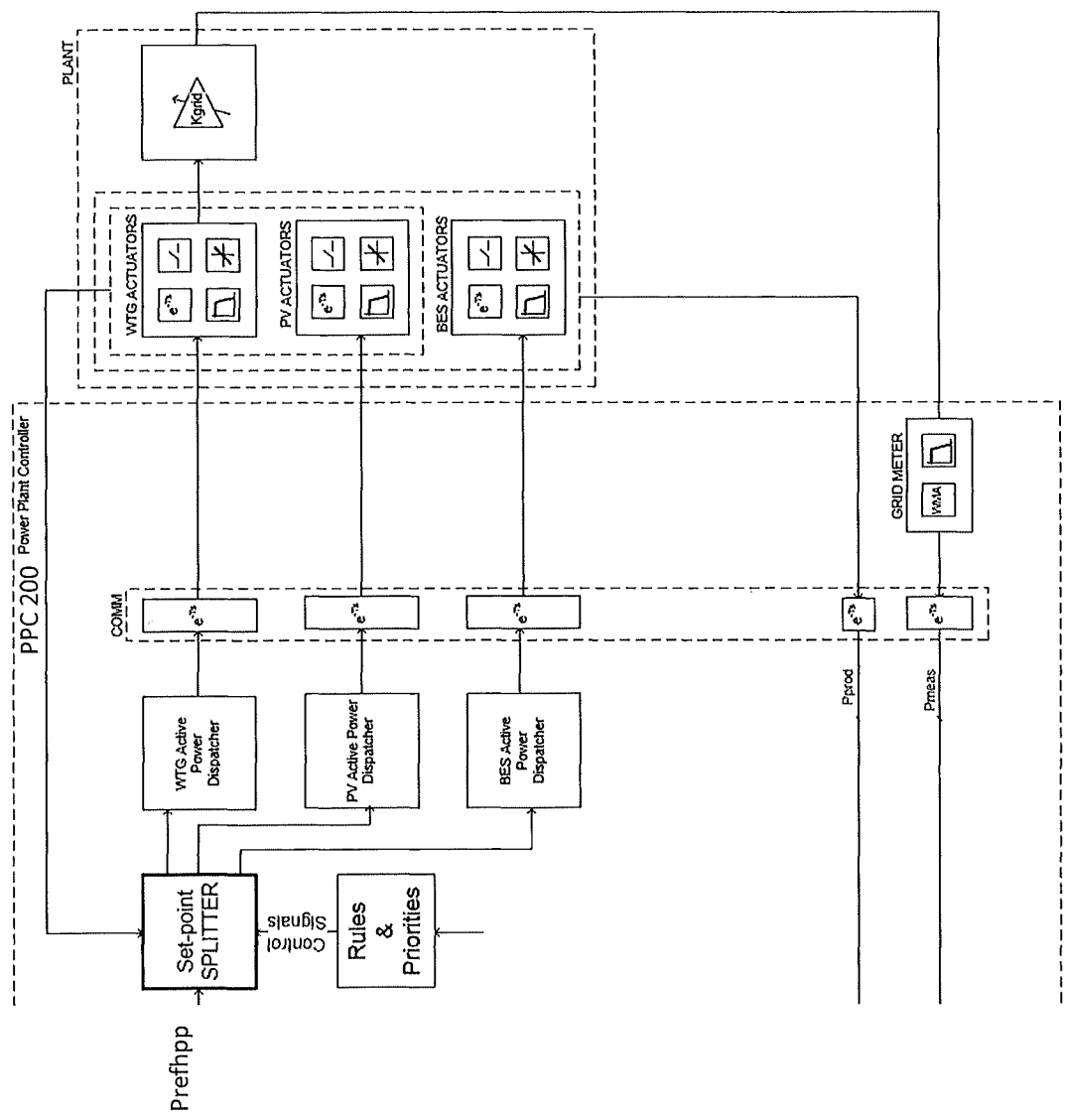
Figure 5:
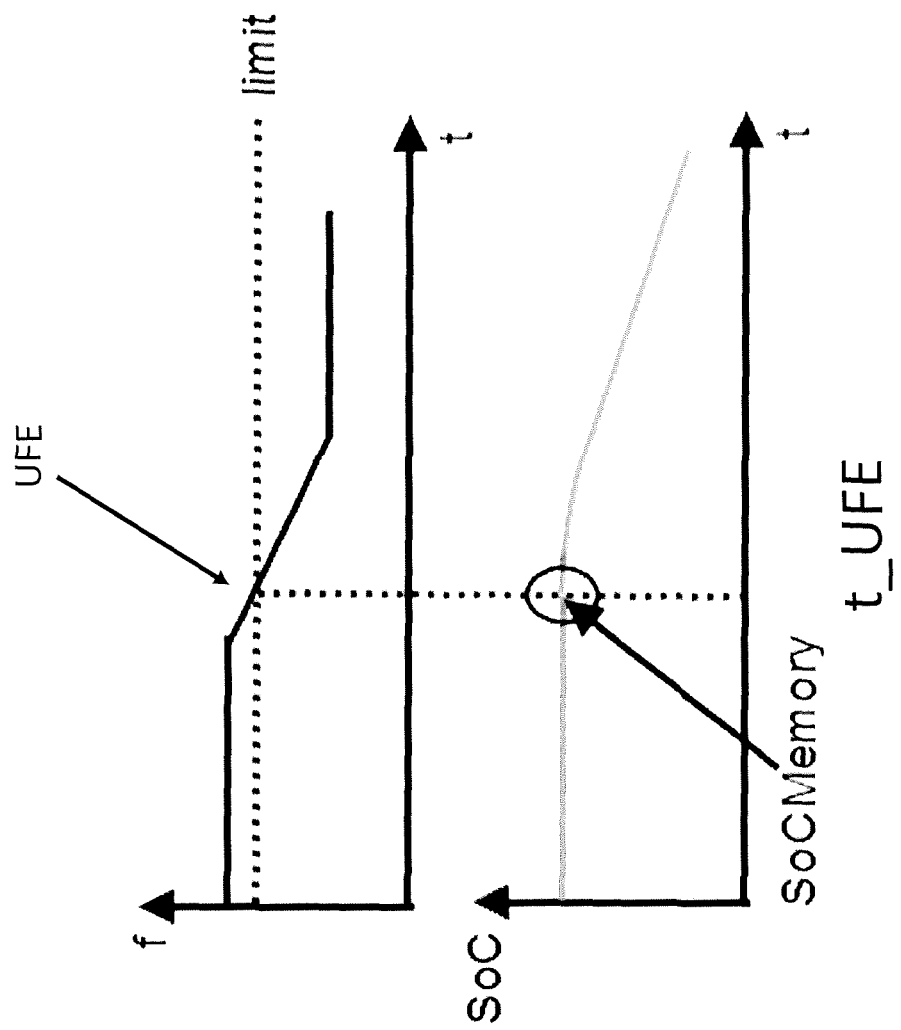
FIG. 5 is a schematic graph of a frequency deviation and the state-of-charge-(SOC) of the energy storage unit during an under-frequency event (UFE), FIG. 6 schematically shows a graph with a frequency deviation profile (A) over time.

FIG. 5 is a schematic graph of a frequency deviation (upper graph) and the state-of-charge-(SOC) of the energy storage unit (lower graph) during an under-frequency event (UFE), schematically indicated as the frequency line falls below the dotted line 'limit', e.g. a frequency deadband from the TSO, at the time t_UFE. Also shown schematically is the state of charge (SoC) of the energy storage unit at the time when said under-frequency event occur; 'SoC_memory' or just referenced SoC_mem in the following. The energy storage unit is the third energy asset EA3 in FIG. 3, more specifically a battery energy system BES resulting in a power output Pout_BES. Likewise, the energy storage unit is shown in FIG. 4B as the 'BES ACTUATORS' electrically providing additional power to the grid when needed in case of an under-frequency event (UFE).

Figure 6:
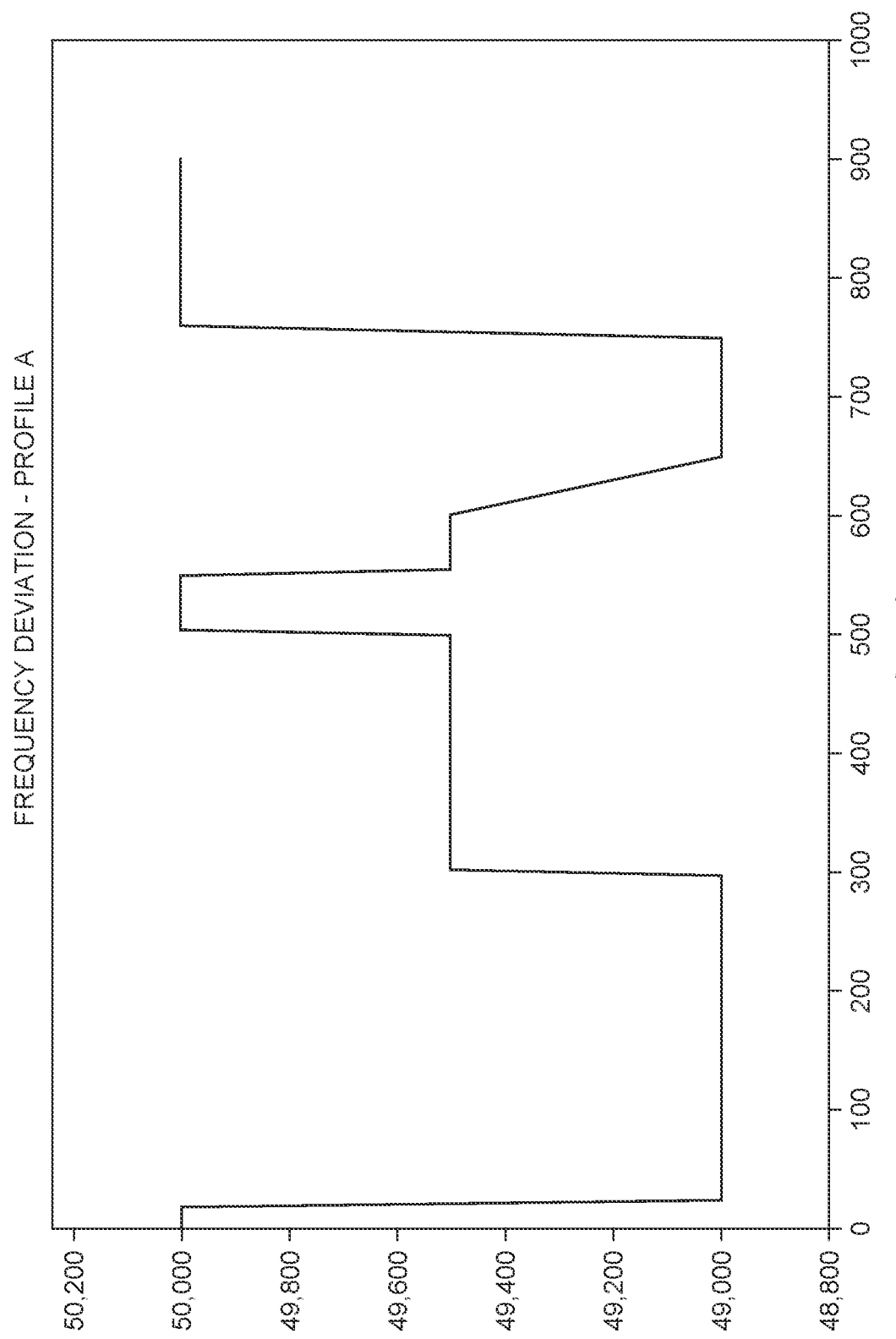

FIG. 6 schematically shows a graph with a frequency deviation profile (A) over time (in seconds). Thus, from an initial 50 Hz frequency around t=0 seconds, the frequency suddenly drops to 49 Hz and stays at this level for around 300 seconds, followed by stepwise increase back to 50 Hz around 500 seconds, which is then followed by yet another drop back to 49 Hz at around 650 seconds. Finally, the frequency returns to the desired value of 50 Hz shortly before 800 seconds. This kind of frequency represent a typically frequency event experienced in some grids with two drops in the frequency.

Figure 7A:
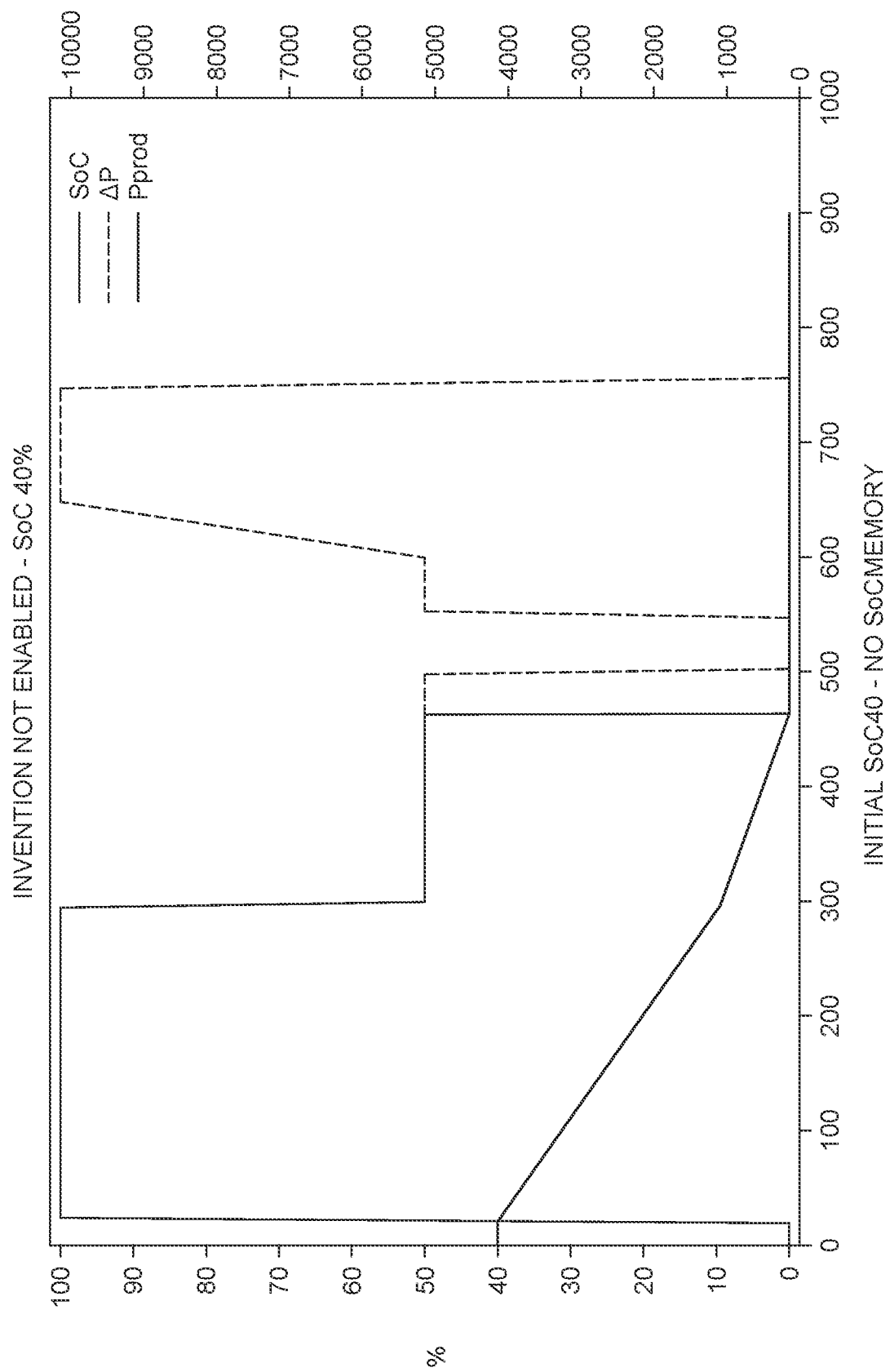
FIGS. 7-8 show simulated graphs of four different situations of the hybrid power plant in response to the frequency deviation profile (A) from FIG. 6, FIG. 9 schematically shows another graph with a frequency deviation profile (B) over time similar to FIG. 6, FIGS. 10-11 show simulated graphs of four different situations of the hybrid power plant in response to the frequency deviation profile (B) from FIG. 9.
Figure 7B:
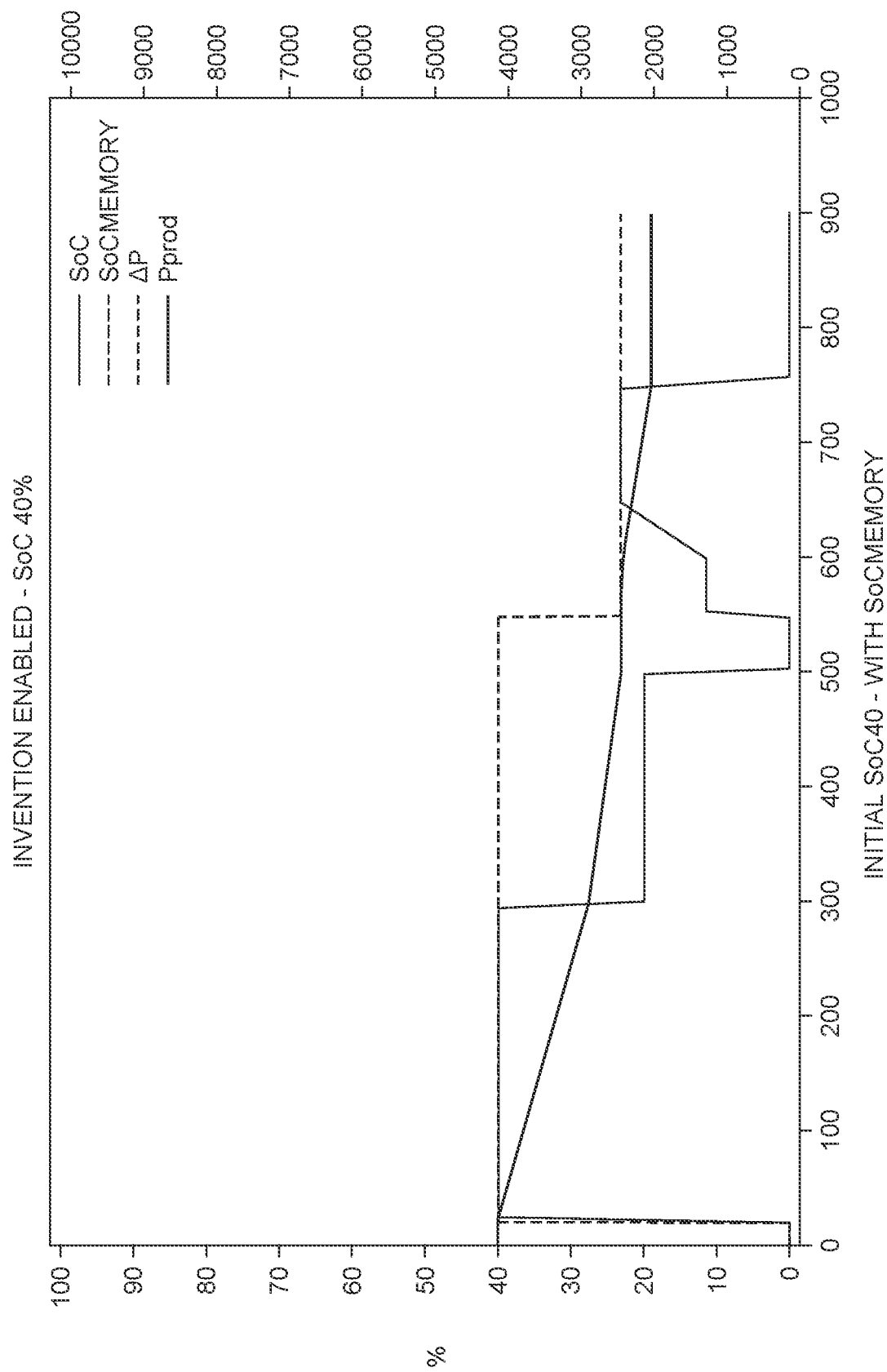
Figure 8A:
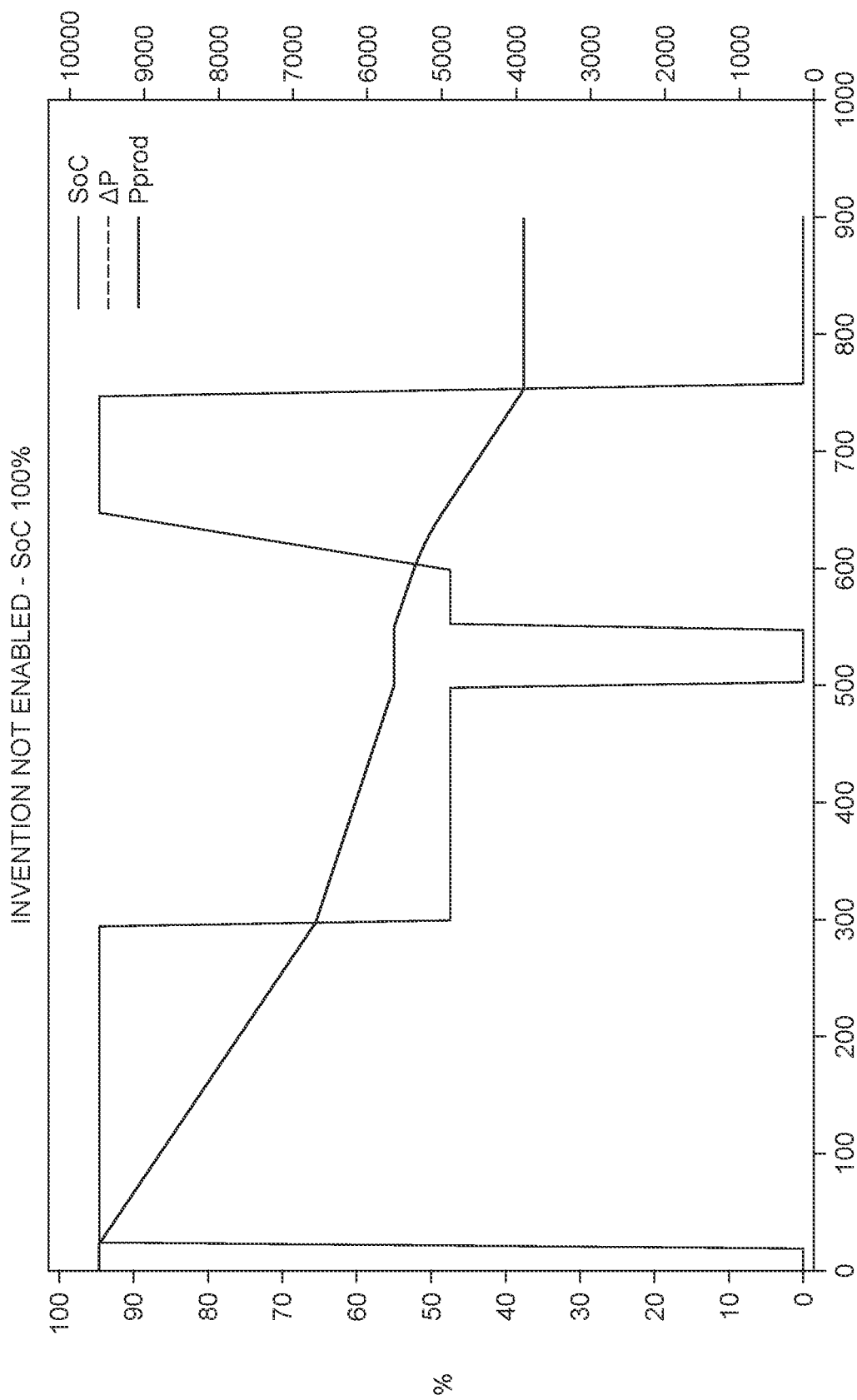
Figure 8B:
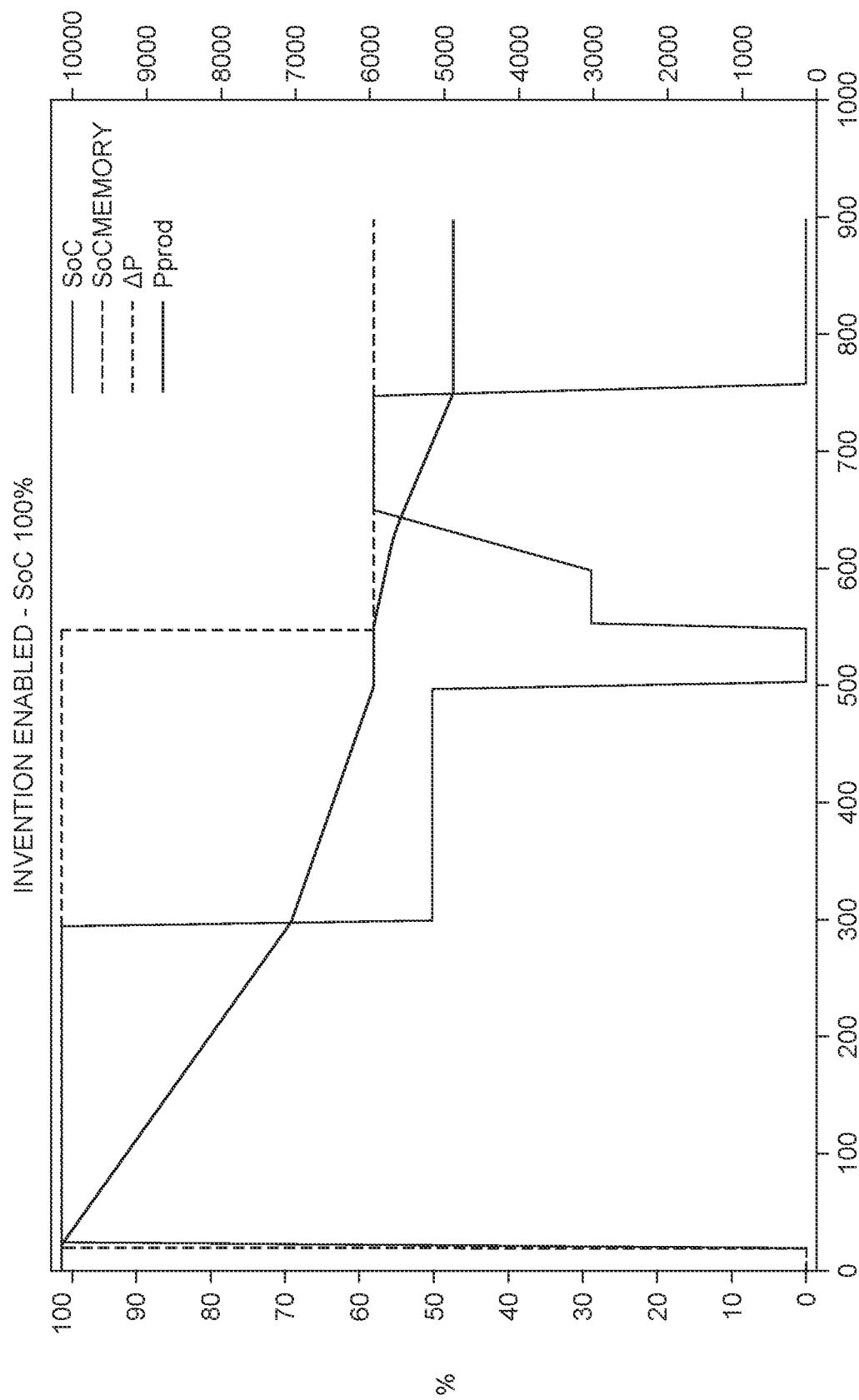

FIGS. 7-8 show simulated graphs of four different situations of the hybrid power plant in response to the frequency deviation profile (A) from FIG. 6. In these simulations, ΔP indicates the reference signal transmitted to the energy storage unit from the power plant controller PCC and Pprod indicates the actual power from the energy storage unit delivered to the electrical grid, the two being substantial identical when the state of charge SoC is above zero. Thus, in FIG. 7 initially the state of charge is 40% of the energy storage unit, e.g. a battery energy system BES, whereas in FIG. 8 initially the state of charge is 100% of the energy storage unit, e.g. a battery energy system BES. For comparison, the present invention is not enabled in FIG. 7A and FIG. 8A to facilitate illustration of the effect of the present invention being implemented in FIG. 7B and FIG. 8B with a SoC_mem of 40% and 100%, respectively. For the simulations where the invention is not enabled ("No SoC-Memory"), the response is a state of the art response where a full discharge is performed i.e. the delivered energy is 100%.

When considering the effect of the invention from FIG. 7B, it is observed that the initial response Pprod from the BES is more limited being around 40% (FIG. 7A being initially 100%) but the BES is then not empty of energy after 500 seconds when the second frequency drop occurs. Thus, the invention provides more stability over a longer period of time under the frequency event UFE from FIG. 6. Similarly, in FIG. 8 the effect of the invention is notable in that the energy, or SoC, in the BES at time of the second frequency drop after 500 seconds is relatively higher again yielding an improved stability over time.

Figure 9:
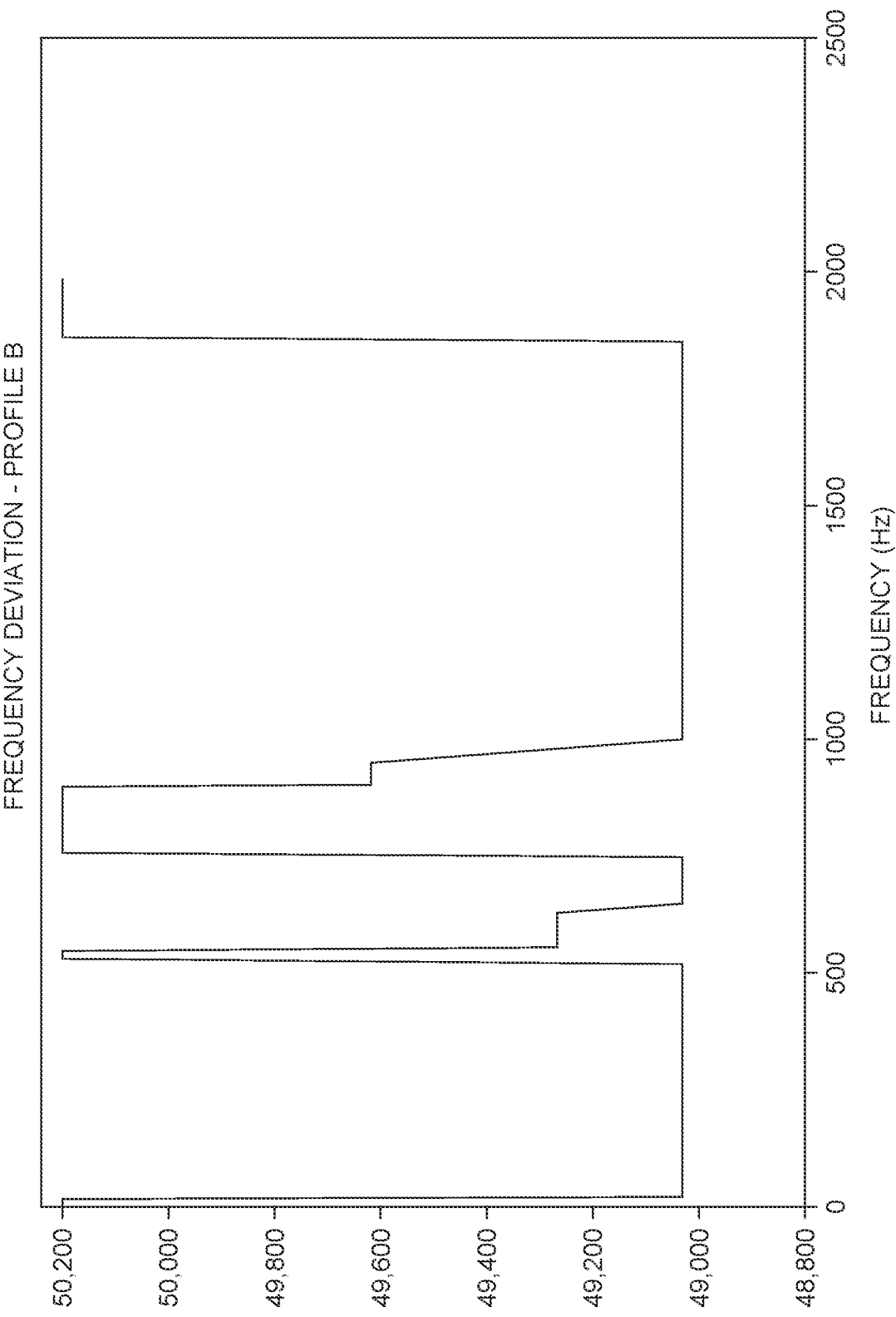

FIG. 9 schematically shows another graph with a frequency deviation profile (B) over time similar to FIG. 6, but with a total of three frequency drops thereby demanding an even higher capacity of the energy storage unit for frequency support during this under-frequency event UFE. This kind of frequency also represent a typically frequency event experienced in some grids with a series of subsequent drops in the frequency.

Figure 10A:
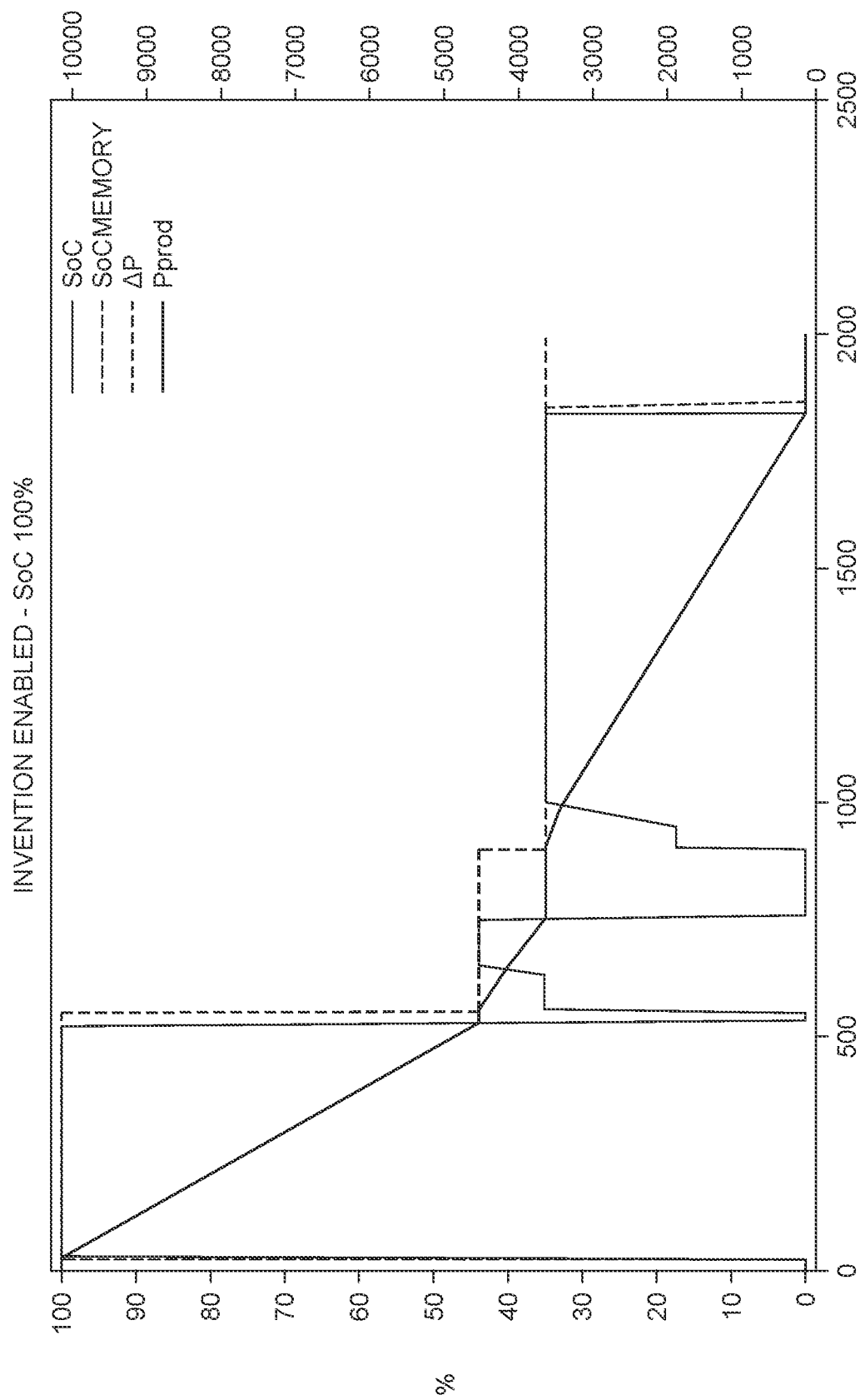
Figure 10B:
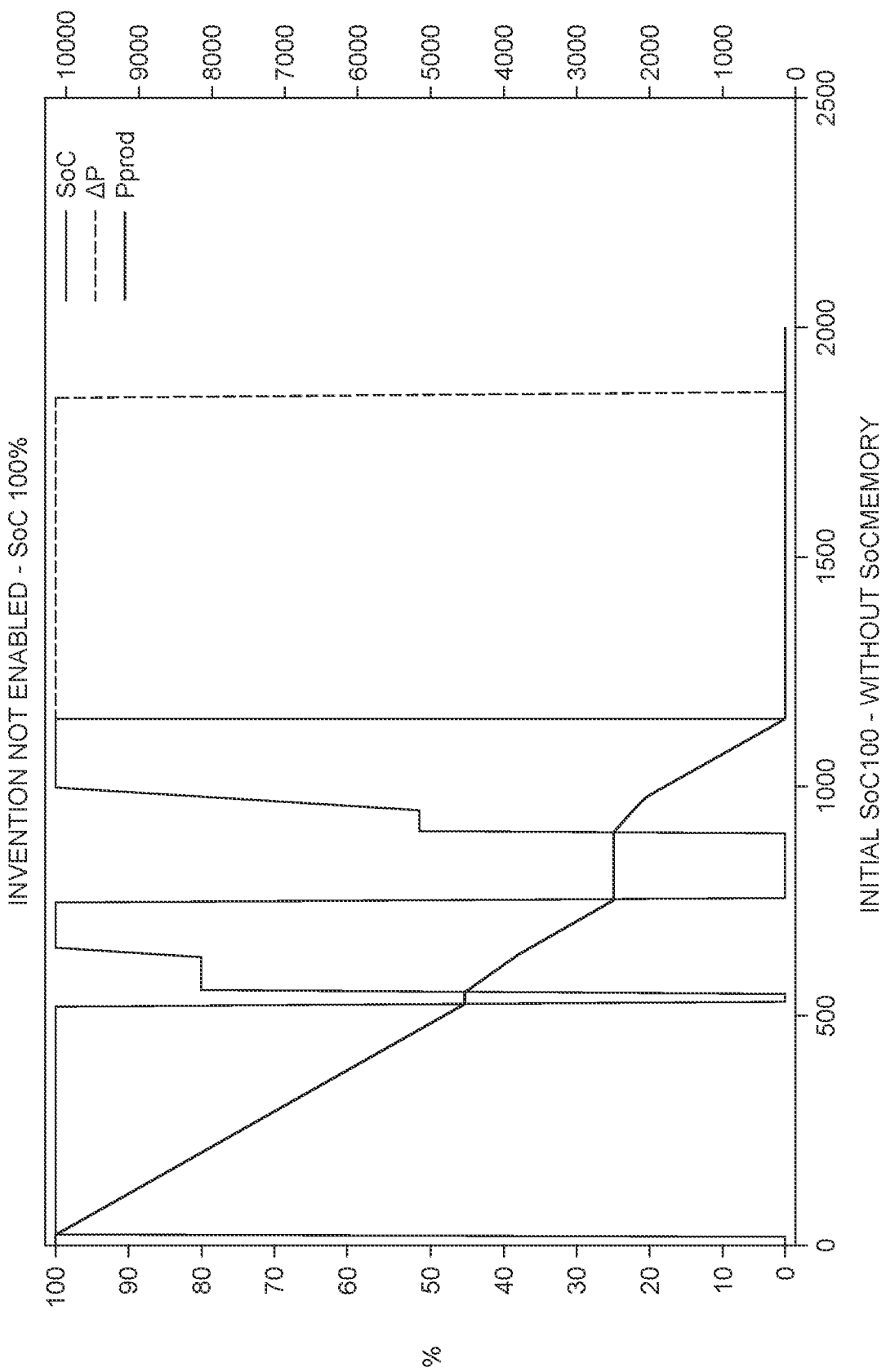
Figure 11A:
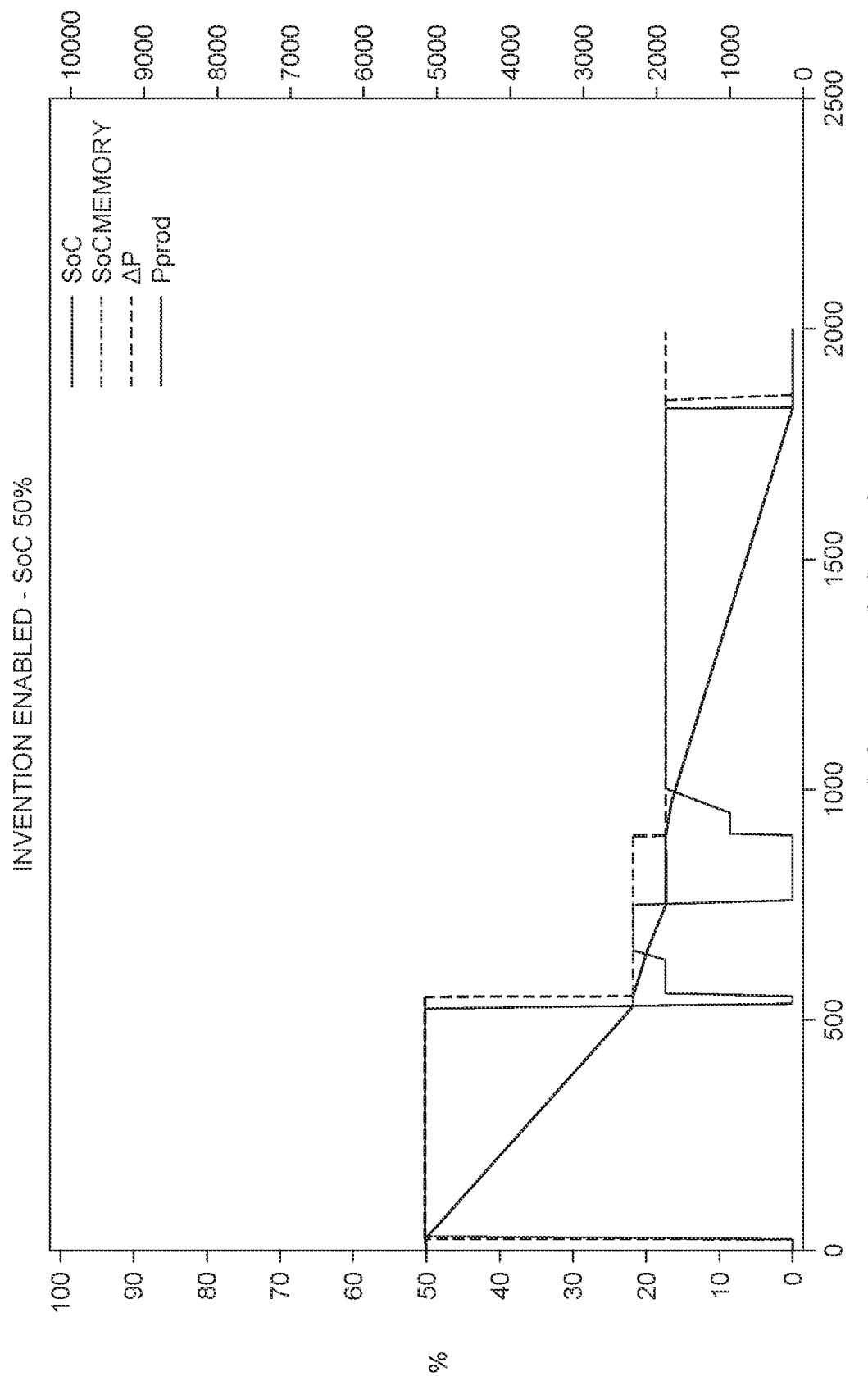
Figure 11B:
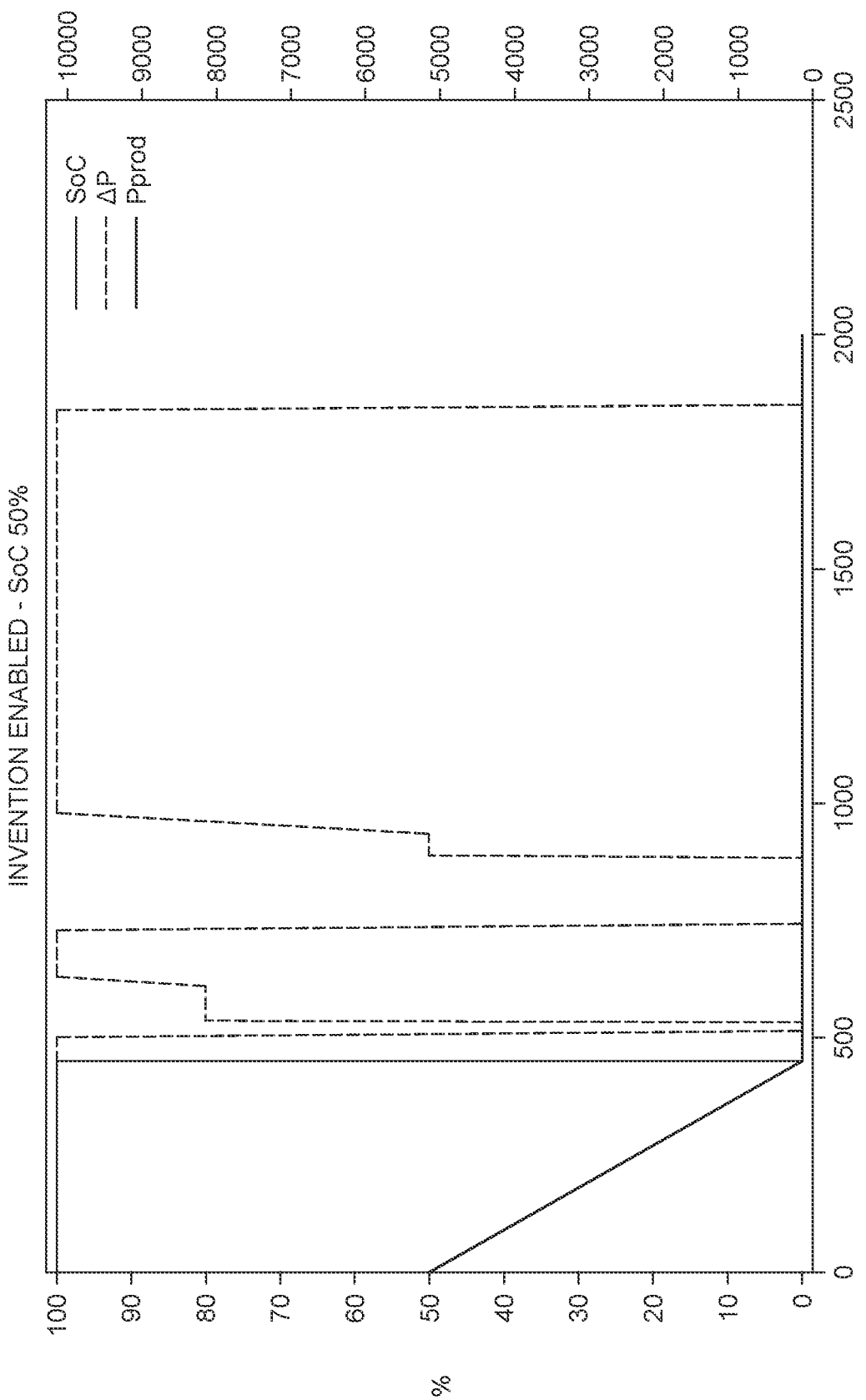

FIGS. 10-11 again show simulated graphs of four different situations of the hybrid power plant in response to the frequency deviation profile (B) from FIG. at two different initial SoC levels; 100% in FIG. 10 and 50% in FIG. 11. Also for these simulations, ΔP indicates the reference signal transmitted to the energy storage unit and Pprod indicates the actual power from the energy storage unit transmitted to the electrical grid, the two being substantial identical when the state of charge SoC is above zero. Thus, FIGS. 10A and 11A particularly illustrate the effect of the invention with respect to stability because the energy storage unit is able to deliver power, and thereby frequency support to the grid, for a relatively longer period of time during the UFE profile B shown in FIG. 9. Thus, for example as seen in FIG. 11B, the energy storage unit is already depleted of energy after approximately 500 seconds by producing around 100% during the initial frequency drop, whereas the energy storage unit ESU with the invention implemented will perform frequency support more than 1500 seconds as seen in FIG. 11A. Thus, the energy saved from producing around 50% (with SoC_mem also being 50% in this example) in the initial frequency drop enables a longer period of frequency support during the UFE.

Figure 12:
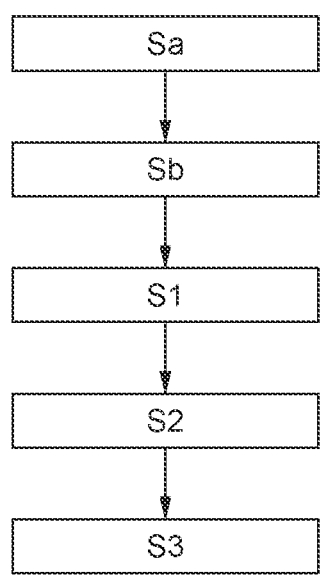
FIG. 12 is a schematic system-chart representing an out-line of/in detail the operations of the computer program product according to the invention or a method according to the invention.

FIG. 12 is a schematic system-chart representing an out-line of/in detail the operations of the computer program product according to the invention or a method according to the invention. Thus, a method for controlling a hybrid power plant; the hybrid power plant 100 is connected to an electrical grid 1000 for producing power to said electrical grid, the hybrid power plant comprising a plurality of energy assets:

Sa a first renewable power generating unit, EA1, 1RPGU, and

Sb an energy storage unit, EA3, ESU, preferably a battery energy storage system BES, said energy storage unit being capable of storing energy from said first renewable power generating unit, and delivering power to said electrical grid when required, wherein the method comprises S1 communicating with the plurality of energy assets, S2 measuring and/or receiving information from the electrical grid that an under-frequency event UFE has occurred in the electrical grid, and, S3 when such an under-frequency event occurs, providing frequency support during the under-frequency event UFE by providing additional power ΔP, illustrated in FIGS. 7-8 and 10-11, as a function of a state of charge SoC of the energy storage unit at the time when said under-frequency event occur SoC_mem.

In summary, the invention relates to a hybrid power plant 100 for producing power to the electrical grid, the hybrid power plant comprising a plurality of energy assets; a first renewable power generating unit, such as wind turbine generators, WTG1, WTG2, and an energy storage unit, EA3, ESU, preferably a battery energy storage system BES. The hybrid power plant has a power plant controller PPC, 200 arranged to communicate with the plurality of energy assets, and, when an under-frequency event occurs, the energy storage unit, ESU, BES) provides frequency support during the under-frequency event UFE by providing additional power ΔP as a function of a state of charge SoC of the energy storage unit at the time when the under-frequency event occurs SoC_mem, as schematically shown in FIG. 2. Thus, during an under-frequency event, it is possible to obtain a more stable power output from the hybrid power plant.

The invention can be implemented by means of hardware, software, firmware or any combination of these. The invention or some of the features thereof can also be implemented as software running on one or more data processors and/or digital signal processors.

The individual elements of an embodiment of the invention may be physically, functionally and logically implemented in any suitable way such as in a single unit, in a plurality of units or as part of separate functional units. The invention may be implemented in a single unit, or be both physically and functionally distributed between different units and processors.

Although the present invention has been described in connection with the specified embodiments, it should not be construed as being in any way limited to the presented examples. The scope of the present invention is to be interpreted in the light of the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A hybrid power plant connected to an associated electrical grid for producing power to the electrical grid, the hybrid power plant, comprising:

a plurality of energy assets, comprising:
a first renewable power generating unit; and,
an energy storage unit, comprising a battery energy storage system, the energy storage unit being capable of storing energy from the first renewable power generating unit, and delivering power to the electrical grid when required; and a power plant controller arranged to:
communicate with the plurality of energy assets; and
in response to determining that a frequency of the electrical grid falls below a dead band frequency:
determining a first state of charge (SOC) of the energy storage unit;
determining a first curve expressing additional power that the energy storage unit provides to the electrical grid as a function of the frequency of the electrical grid, wherein a first slope of the first curve is based on the first SOC of the energy storage unit; and
providing a first amount of power from the energy storage unit to the electrical grid based on the first curve and the frequency of the electrical grid until the frequency of the electrical grid returns within the dead band frequency; and after the frequency of the electrical grid returns within the dead band frequency, in response to determining that the frequency of the electrical grid falls below the dead band frequency:
determining a second SOC of the energy storage unit lower than the first SOC of the energy storage unit;
determining a second curve expressing additional power that the energy storage unit provides to the electrical grid as a function of the frequency of the electrical grid, wherein a second slope of the second curve is based on the second SOC of the energy storage unit and is lower than the first slope; and providing a second amount of power from the energy storage unit to the electrical grid based on the second curve and the frequency of the electrical grid until the frequency of the electrical grid returns within the dead band frequency.

2. The hybrid power plant according to claim 1, wherein the first renewable power generating unit comprises a plurality of wind turbine generators.

3. The hybrid power plant according to claim 1, where the hybrid power plant comprises a second renewable power generating unit, the second renewable power generating unit being different from the first renewable power generating unit, the second renewable power generating unit comprises a plurality of solar power units.

4. The hybrid power plant according to claim 3, wherein the energy storage unit is further capable of storing energy from the second renewable power generating unit, and wherein the power plant controller is further arranged to communicate with the second renewable power generating unit.

5. The hybrid power plant of claim 1, wherein the power plant controller is arranged to reserve a pre-defined level of state of charge from the energy storage unit for providing frequency support in case of an under-frequency event, the level above the pre-defined level of state of charge from the energy storage unit being available for power production from the hybrid power plant when there is no under-frequency event.

6. The hybrid power plant according to claim 5, wherein the power plant controller is arranged to prioritize charging of the energy storage unit when a current state of charge is below the pre-defined level state of charge from the energy storage unit.

7. The hybrid power plant according to claim 3, the hybrid power plant further comprises:
a module for deriving an estimated value for electrical losses in the hybrid power plant;
a module for deriving a measured value for electrical losses in the hybrid power plant based on a difference between an aggregated power production from the plurality of energy assets and a power measurement at a point of common coupling; and
a regulator arranged to apply the estimated value for electrical losses and the measured value for electrical losses in an active power control loop in the power plant controller, the active power control loop being arranged to control an active power production of the hybrid power plant at the point of common coupling, wherein an available power from the first renewable power generating unit or the second renewable power generating unit is calculated using the regulator.

8. A power plant controller for controlling an associated hybrid power plant connected to an associated electrical grid for producing power to the electrical grid, the hybrid power plant comprising a plurality of energy assets, the plurality of energy assets comprising:
a first renewable power generating unit; and
an energy storage unit being capable of storing energy from said first renewable power generating unit, and delivering power to the electrical grid when required, wherein the power plant controller is arranged to:
communicate with the plurality of energy assets; and
in response to determining that a frequency of the electrical grid falls below a dead band frequency:
determine a first state of charge (SOC) of the energy storage unit;
determine a first curve expressing additional power that the energy storage unit provides to the electrical grid as a function of the frequency of the electrical grid, wherein a first slope of the first curve is based on the first SOC of the energy storage unit; and
provide a first amount of power from the energy storage unit to the electrical grid based on the first curve and the frequency of the electrical grid until the frequency of the electrical grid returns within the dead band frequency; and
after the frequency of the electrical grid returns within the dead band frequency, in response to determining that the frequency of the electrical grid falls below the dead band frequency:
determine a second SOC of the energy storage unit lower than the first SOC of the energy storage unit;
determine a second curve expressing additional power that the energy storage unit provides to the electrical grid as a function of the frequency of the electrical grid, wherein a second slope of the second curve is based on the second SOC of the energy storage unit and is lower than the first slope; and
provide a second amount of power from the energy storage unit to the electrical grid based on the second curve and the frequency of the electrical grid until the frequency of the electrical grid returns within the dead band frequency.

9. A method for controlling a hybrid power plant connected to an electrical grid for producing power for the electrical grid, the method comprising:
communicating with a plurality of energy assets of the hybrid power plant, wherein the plurality of energy assets comprises:
a first renewable power generating unit; and
an energy storage unit comprising a battery energy storage system, the energy storage unit being capable of storing energy from the first renewable power generating unit, and delivering power to the electrical grid when required; and
in response to determining that a frequency of the electrical grid falls below a dead band frequency:
determining a first state of charge (SOC) of the energy storage unit;
determining a first curve expressing additional power that the energy storage unit provides to the electrical grid as a function of the frequency of the electrical grid, wherein a first slope of the first curve is based on the first SOC of the energy storage unit; and
providing a first amount of power from the energy storage unit to the electrical grid based on the first curve and the frequency of the electrical grid until the frequency of the electrical grid returns within the dead band frequency; and
after the frequency of the electrical grid returns within the dead band frequency, in response to determining that the frequency of the electrical grid falls below the dead band frequency:
determining a second SOC of the energy storage unit lower than the first SOC of the energy storage unit;
determining a second curve expressing additional power that the energy storage unit provides to the electrical grid as a function of the frequency of the electrical grid, wherein a second slope of the second curve is based on the second SOC of the energy storage unit and is lower than the first slope; and
providing a second amount of power from the energy storage unit to the electrical grid based on the second curve and the frequency of the electrical grid until the frequency of the electrical grid returns within the dead band frequency.

* * * * *